US009480263B2

(12) United States Patent
Van Der Leest et al.

(10) Patent No.: US 9,480,263 B2
(45) Date of Patent: Nov. 1, 2016

(54) SKINNING DEVICE FOR REMOVING SKIN FROM AN ANIMAL CARCASS

(71) Applicant: MAREL MEAT PROCESSING B.V., Boxmeer (NL)

(72) Inventors: Johannes Cornelis Antonius Maria Van Der Leest, Oss (NL); Dennis Stoots, Oss (NL); Jan Meerdink, Ravenstein (NL)

(73) Assignee: MAREL MEAT PROCESSING B.V., Boxmeer (NL)

( * ) Notice: Subject to any disclaimer, the term of this patent is extended or adjusted under 35 U.S.C. 154(b) by 0 days.

(21) Appl. No.: 14/902,659

(22) PCT Filed: Jul. 7, 2014

(86) PCT No.: PCT/EP2014/064470
§ 371 (c)(1),
(2) Date: Jan. 4, 2016

(87) PCT Pub. No.: WO2015/001127
PCT Pub. Date: Jan. 8, 2015

(65) Prior Publication Data
US 2016/0174581 A1  Jun. 23, 2016

(30) Foreign Application Priority Data
Jul. 5, 2013 (EP) .................................. 13175388

(51) Int. Cl.
*A22B 5/00* (2006.01)
*A22B 5/16* (2006.01)

(52) U.S. Cl.
CPC ............... *A22B 5/168* (2013.01); *A22B 5/161* (2013.01)

(58) Field of Classification Search
CPC ..... A22B 5/161; A22C 17/12; A22C 25/006
USPC ......................... 452/125, 128–130, 132, 133
See application file for complete search history.

(56) References Cited

U.S. PATENT DOCUMENTS

| 3,149,923 A * | 9/1964 | Hughes .................. A22C 17/12 452/125 |
| 4,071,923 A * | 2/1978 | Smith .................... A22B 5/168 452/133 |

(Continued)

OTHER PUBLICATIONS

International Search Report for corresponding International PCT Application No. PCT/EP2014/064470, Sep. 26, 2014.

*Primary Examiner* — Richard Price, Jr.
(74) *Attorney, Agent, or Firm* — Workman Nydegger (57) ABSTRACT

A skinning device for removing skin from an animal carcass has a housing, a manipulation arm extending from the housing, an cutting blade, a motor driven tooth roll mounted on the housing having plurality of tooth wheels arranged in axially spaced apart arrangement such that the space between adjacent tooth wheels has a pre-set distance. The tooth wheels have circumferentially arranged teeth projecting outwardly therefrom adapted to grab the skin with the circumferentially arranged teeth and pull it towards the cutting blade. The skinning device includes a support structure mounted on the housing arranged in proximity to the tooth roll, and is adapted to engage the skin while the skin is simultaneously being pulled off the carcass. Strippers are arranged in the space of pre-set distance and circumferentially surround at least a space portion where the arc-shaped contour essentially follows the tooth roll.

16 Claims, 6 Drawing Sheets

(56) References Cited

U.S. PATENT DOCUMENTS

| | | | | |
|---|---|---|---|---|
| 4,186,461 A * | 2/1980 | Leining | A22B 5/166 | 452/133 |
| 4,451,953 A * | 6/1984 | Leining | A22B 5/166 | 452/130 |
| 4,631,780 A * | 12/1986 | Leining | A22B 5/166 | 452/130 |
| 4,993,112 A * | 2/1991 | Burnett | A22C 17/12 | 30/276 |
| 5,011,454 A * | 4/1991 | Townsend | A22C 17/12 | 452/125 |
| 5,326,310 A * | 7/1994 | Gugg | A22B 5/16 | 452/127 |
| 5,766,066 A * | 6/1998 | Ranniger | A22B 5/166 | 452/125 |
| 6,089,967 A * | 7/2000 | Gugg | A22C 17/12 | 452/127 |
| 6,357,346 B1 | 3/2002 | Townsend | | |
| 8,840,448 B1 * | 9/2014 | Kielian | A22C 25/17 | 452/125 |

* cited by examiner

SKINNING DEVICE FOR REMOVING SKIN FROM AN ANIMAL CARCASS

FIELD OF THE INVENTION

The present invention relates to a skinning device for removing skin from an animal carcass.

BACKGROUND OF THE INVENTION

U.S. Pat. No. 4,631,780 describes a hand-held skinner for removing strips of skin from animal carcasses comprising an elongate handle including an air motor and having a housing mounted at one end thereof. This hand-held skinner comprises a tooth roll assembly having a pair of substantially identical tooth roll members, each including plurality of teeth which are arranged in circumferentially extending and axially spaced apart rows to thereby define an annular recess between adjacent rows. A threaded output shaft of the air motor is provided for threadedly engaging with a worm gear that is connected to the tooth roll members so when the air motor is energized the shaft and the worm gear mounted thereon will be rotated and thus the tooth roll member.

This hand-held skinner has however several drawbacks, such as that fat and even skin becomes easily accumulated in the recesses and in the space between the two tooth roller members causing blocking of the skinner which thus blocks all subsequent processing steps since the process of releasing the blocking can be time consuming. Moreover, such blocking reduces the lifetime of the motor running the skinner. Also, releasing such blocking by the operator can increases the risk of injuries of the operator but many accidents in the recent years may be attributed to when an operator was trying to release such a blocking. One way of solving the above mentioned blocking problem is by means of implementing more powerful motor, but a more powerful motor is not only heavier but also more costly.

Another disadvantage with this handheld skinner may be linked to the internal arrangement between the cutting blade of the hand-held skinner and the tooth roll assembly causing that too much fat is removed with the skin. The fact that the price of the skin is less than that of the fat leads therefore to a less throughput of this hand-held skinner.

U.S. Pat. No. 4,186,461 discloses a hand held skinner for removing the skin from animal carcasses and comprises a housing having a handle attached thereto. A stationary blade is mounted on the housing closely adjacent a driven revolvable feeder roll assembly, which grips and pulls the animal skin against the blade to permit the skin to be progressively moved from the carcass. Means are provided for driving the roll assembly and this means includes an elongated drive shaft which is journaled in bearings positioned within the housing. The shaft projects through the knife handle and is connected by coupling to an elongated flexible shaft which in turn is connected to a source of power for imparting rotary motion to the flexible shaft. The forward end of the drive shaft is provided with a worm which meshes with a worm gear to drive the latter in a counter-clockwise direction.

Due to how exposed the drive system is there is a high risk that the drive becomes contaminated with tendons and sinews which lower the power of the drive (air motor), with the result that the skin gets stuck in the drive system and the skinner stops and the motor may easily be destroyed. Also, having the drive in the middle result in that the tooth role has less grip because there are no teeth in the middle for gripping the skin, which obviously leads to difficulties in removing the skin. Moreover, when the tooth role hits the product on e.g. the shank bone part, the knife may easily become damaged because there is less support in the middle of the role.

SUMMARY OF THE INVENTION

On the above background it is an object of embodiments of the present invention to provide an improved skinning device that is not only free of said blocking during processing thus making the skinning device more safe towards an operator working on it, but that is also more effective and which has an higher throughput, and has in consequence devised the present invention.

In one embodiment of the invention, it would be advantageous to achieve an improved skinning device that is free from said blocking and that is capable of removing skin from an animal carcass with minimum amount of fat. Embodiments of the invention preferably seeks to mitigate, alleviate or eliminate one or more of the above mentioned disadvantages singly or in any combination. In particular, it may be seen as an object of embodiments of the present invention to provide a skinning device that solves the above mentioned problems, or other problems, of the prior art.

To address one or more of these concerns, in a first aspect of the invention a skinning device for removing skin from an animal carcass is provided, comprising:
a housing,
a manipulation arm extending from said housing,
a cutting blade,
a motor driven tooth roll mounted on said housing having plurality of tooth wheels arranged in axially spaced apart arrangement with a mutual distance between adjacent tooth wheels to define a space there between, said tooth wheels having circumferentially arranged teeth projecting outwardly therefrom adapted to grab a skin of an animal carcass and pull it towards said cutting blade,
wherein the skinning device further comprises:
a support structure mounted on said housing arranged in proximity to said tooth roll, said support structure being shaped such that at least a portion of a side of the support structure facing said tooth roll has an arc-shaped contour essentially following said tooth roll with a gap between the support structure and the tooth roll, said support structure being rigidly fixed in relation to said tooth roll and is adapted to engage the skin while pulling the skin along said arc between said support structure and said tooth roll while the skin is simultaneously being pulled off the carcass, and strippers arranged in said space between adjacent tooth wheels, where said strippers circumferentially surround at least a space portion where said arc-shaped contour essentially follows said tooth roll.

The fact that said strippers are arranged in said space between adjacent tooth wheels ensures that no or negligible amount of fat and/or skin will be accumulated in the space between said tooth wheels. This increases the throughput of device because of the elimination of waste time that would otherwise be needed in releasing such blocking. Also, said device is safer towards an operator of the device since releasing such a blocking is performed by the operator and requires that the operator brings his/her hands in close proximity to the cutting blade and the tooth wheel, which may evidently cause an accidental actuation of said tooth wheel.

The space between adjacent tooth wheels could be of a pre-set distance.

Also, because of this internal arrangement between the tooth roller and the cutting blade, but the circumferentially arranged teeth preferably project outwardly therefrom towards a rotating direction of the tooth wheel which is typically clockwise, which in an embodiment may be an elongated cutting blade, where the teeth pulls the skin towards said cutting blade, it is now possible to implement the skinning device for skinning up-to-down. Such an up-to-down operation is e.g. of particular advantage when skinning traject at the low foot of a pork that is hanging. In order to get a grip between the low foot of the pork and the skinning device a firm surface is needed to start on, i.e. the bone of the low foot, because the skinning device must hit the low foot with some impact at the start position to achieve an initial grip with the skin, where subsequently the skinning device is moved downwards while removing a skin stripe of the animal carcass.

Further, the skinner device according to the present invention may further be adapted to remove the fat from the animal carcass subsequent to the skin removal. The fat thickness may be different depending e.g. on the where on the animal carcass it is, e.g. the neck area typically contains more fat than the shank area, or the thickness of the fat may depend on the type of animal species. If as an example the animal carcass is a pig the fat on the outside of the pig closest to the skin is hard fat that gradually changes to a soft fat, which will be very difficult if not impossible to remove with prior art skinner devices. This is because the soft fat has the least structure and thus is the part of the animal carcass that has the highest risk of blocking tendency of the skinner device. Today the fat removal is typically done by straight manual knife or by using whizard knife. The use of manual knife results however in that the production speed is low and it is difficult to control the fat removal since it is purely a manual operation. Also, due to the shape of the whizar knife the cut will always be convex shaped, instead of having a straight cut that follows the shape of the carcass transverse to the moving direction if the whizar knife. Thus, in order to remove the fat properly there will always be some simultaneous meat removal, which obviously results in a less throughput of the processing.

Accordingly, the fact that embodiments of the skinning device according to the present invention may also be utilized to remove the fat makes that processing more efficient and the throughput will be increased.

Additionally, since a single motor driven tooth roll is used instead of e.g. two side by side arranged tooth rolls, the grap between the skinner device and the skin is enhanced. The knife is therefore nowhere along the motor driven tooth roll expose meaning that the risk of damaging the knife is reduced if not eliminated.

In one embodiment, said skinning device is a hand-held device and said manipulation arm is a handle having a motor for driving said tooth roll incorporated therein, said handle having associated thereto an actuating means connected thereto to permit an operator of said device to actuate said motor. Thus, a hand-held skinning device is provided which has, as mentioned above, higher throughput because the operator of the device does not have to invest any time in releasing said blocking and which at the same time makes the device more save towards the operator.

In one embodiment, said manipulation arm is a robotic arm associated with a robotic system. The robotic system may be system of any type know to a skilled person in the art, e.g. a robotic system comprising a vision system for identifying the location of the animal carcass and/or the shape of the carcass, and/or the robotic system may additionally be provided with a sensing device for sensing the repulsive force exerted by the animal carcass onto the skinning device where a resulting sensing signal may be utilized for by the robotic system to move the skinning device smoothly along the animal carcass during the skin removal. The motor for driving said tooth roll may be arranged within the robotic system, or within said manipulation arm.

In one embodiment, said arc where said support structure facing the tooth roll and essentially follows said tooth roll is in the range between 35-55°, preferably in the range between 40-50°, more preferably around 45°. Accordingly, by limiting this traction area to this angle range the power consumed by the motor driving the tooth roll is significantly less compared to the power needed if e.g. the angle range would be 90° or 180°. Thus, lighter and less expensive motors may be implemented.

In one embodiment, the distance between adjacent teeth on said tooth wheels is less than the length of said arc such that at any instant of time there is a traction provided by at least two teeth while pulling the skin along said arc.

In one embodiment, said support structure comprises a shoe and a clamp connected to the shoe, where at least either one of said shoe or said clamp have a groove that extends transversely from a first edge to a second edge, where said cutting blade is positioned within said groove between said clamp and said shoe and extends outwardly therefrom.

In one embodiment, the length of said cutting blade is longer that the length of said tooth roll, the internal arrangement between the tooth roll and the cutting blade being such that a portion of the cutting blade exceeds the opposite ends of the tooth roll, and where upwardly protruding portions are provides in front of said portion of the cutting blade. Thus, the upwardly protruding portions ensure that the corners of the cutting blade are shielded. Also, the upwardly protruding portions act as "bumps", which force the skin at the opposite ends of the skinning device upwards and opposite to the moving direction of the skinning device resulting in a side cut of the skin so that skin is cut as strips. Moreover, via appropriate "turn" of the device it is easy perform a cut across the skin strip and thus release the skin from the device.

In one embodiment, at least one of said upwardly protruding portions is a retainer that engages with an opening in said housing in a clamping and non-clamping manner, where one side of said retainer comprises a groove shaped such that the end of said cutting blade fits therein, where said clamping of the cutting blade between said clamp and said shoe is provided via pushing the retainer into said opening with said cutting blade positioned in said groove until said clamping is achieved. A simple solution of inserting/removing the cutting blade into/from the skinning device.

In one embodiment, said strippers circumferentially surround said space all around. In one embodiment, said strippers are arranged such that they have a restricted free movement around said tooth roll. Such a restricted free movement may help reducing friction between the strippers and the tooth roll, but such friction may occur when fat and tendons are pulled between the strippers and the tooth roll, which therefore reduces power consumption.

In one embodiment, said strippers comprise upwardly extending tail parts for guiding skin removed from an animal carcass away from said skinning device and for releasing from the tooth roller. Accordingly, the tail parts of the skinners supply the repelling force that is needed to remove the skin from the tooth wheel and thus ensure that the skin that has been removed from the carcass will not be pulled again by the tooth roll, but instead be guided away from the skinning device.

In one embodiment, said support structure is further shaped such that behind said portion of the side of the support structure facing said tooth roll having the arc-shaped contour essentially following said tooth roll the support structure is shaped such that it deviates away from said tooth roll and provides a guiding area for the skin that has been removed from said carcass.

In one embodiment, the transferring the power from the motor driving said tooth wheel is based on an internal gearing system that transfers that power from a rotation axis of the motor to said tooth roller. Accordingly, using such an internal gearing system it is possible to use a single tooth roll instead of two tooth roller members, where fat and/or skin can accumulate in the space between the two tooth roller causing blocking of the skinner device. Thus, said internal gearing system with said single tooth roll setup overcomes this problem.

In one embodiment, said internal gearing system comprises three bevel gears arranged in a sequence and that are operable connected together, a first bevel gear that is associated to said motor and that drives a second bevel gear, and where the second bevel gear drives a third bevel gear, and where the third bevel gear is mounted to a rotation axis of the tooth roll and thus drives the tooth roll.

In one embodiment, a diameter of said second bevel gear is larger than the diameter of said first bevel gear.

In a second aspect of the invention a method is provided method of removing skin from an animal carcass by means of using said skinner device, comprising:
obtaining a grip of the skin of via said circumferentially arranged teeth of said motor driven tooth roll so as to allow the motor driven tooth roll to pull the skin towards said cutting blade, and
providing a pulling movement of the skinner device while removing the skin while removing a skin from the animal carcass.

The animal carcass may be may, but is not limited to, a pork or a part of a pork, e.g. the fore-end of a pork that may be freely hanging during the skin removal e.g. from a suitable hook-mechanism. In such instances the pulling movement is from up-to-down. In order to get a grip between the fore-end of the pork and the skinning device according to the present invention needs a firm surface to start on that provides a sufficient repelling force, i.e. the bone part area of the fore-end close to the hook-mechanism.

The method according to the present invention should however not be construed as being limited to a freely hanging carcass or carcass part, but the carcass might just as well be partly hanging where e.g. a hook-mechanism exerts with an horizontal force on the carcass or carcass part so that it is positioned incline with respect to an operator or a robotic system that is operating the skinning device, or the carcass might just as well be in a horizontal position during the skinning process.

The pulling of the skin along said arc between said support structure and said tooth roll while simultaneously removing the skin from the carcass ensures that minimum amount of fat will be left on the skin after removing it from the animal carcass which makes the processing more profitable considering the fact that the price of fat is typically higher than the price of skin. This can be ensured because the distance between the support structure and the tooth roll within said arc portion where the arc shape of the support structure and the tooth roll is preferably the same or similar and preferably within the range of the skin thickness. This may as an example be, but is not limited to, one millimeter up to several millimeters or even up to the centimeter range, depending on the skin thickness. This distance between the support structure and the tooth roll may also be adjusted, e.g. when different parts of the animal carcass are to be processed, e.g. if the skin of one part of the animal carcass is thinner or thicker, or if different animals are being processed, the distance between may be adjusted accordingly.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
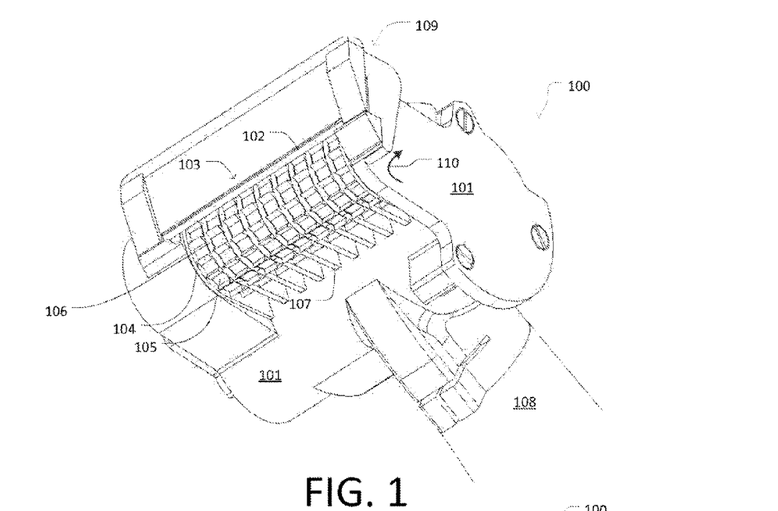
FIG. 1 depicts an embodiment of a skinning device according to the present invention for removing skin from an animal carcass.

FIG. 1 depicts an embodiment of a skinning device 100 according to the present invention for removing skin from an animal carcass. The skinning device 100 comprises a housing 101, a manipulation arm 108 extending from the housing 101, an elongated cutting blade 102, a motor driven tooth roll 103, a support structure 109 rigidly mounted on the housing 101 and plurality of strippers 107.

The motor driven tooth roll 103 is mounted on the housing 101 and comprises plurality of tooth wheels 105 arranged in axially spaced apart arrangement such that the space 106 between adjacent tooth wheels 105 has a pre-set distance. The tooth wheels 105 have circumferentially arranged teeth 104 projecting outwardly therefrom towards the rotating clockwise direction of the tooth wheel 103 as indicated by arrow 110 for grabbing the skin of the animal carcass with the circumferentially arranged teeth 104 and pull it towards said elongated cutting blade 102.

Figure 2:
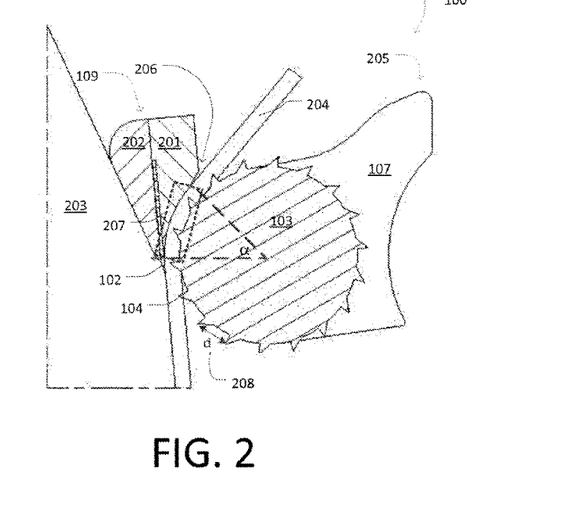
FIG. 2 shows a side view of the skinner device shown in FIG. 1 during skin removal.

FIG. 2 shows a side view of the skinner device 100 shown in FIG. 1 during skin removal, where for clarity reasons the side plates of the housing 101 have been removed. As shown here, the support structure 109 is arranged in proximity to the tooth roll 103 and is shaped such that at least a portion of the side of the support structure that is facing the tooth roll 103 has an arc-shaped contour essentially following the tooth roll. This area shown within the dotted line box 207 may be considered as an active area where the skin 204 removal takes place. It is within this area where the tooth roll 103 and the support structure 109, which are rigidly fixed in relation to each other, provide a traction to the skin 204 while pulling the skin along the arc (within the dotted line box 207) between the support structure 109 and the tooth roll 103 while simultaneously removing the skin from the carcass. In this case, the skin 204 is typically removed from a fat layer 203 of the carcass, which may e.g. be a pork or any other animal species.

Shown is also a side view of the strippers 107 where in this embodiment the strippers circumferentially surround the space between adjacent tooth wheels all around. Moreover, in this embodiment the strippers 107 further comprise a tail part 205 to ensure that the skin that is being removed from the carcass is guided away from the skinner device 100 and also to facilitate the skin release from the tooth roller 103.

The skinners may also be attached or mounted to the tooth wheel such that they do not have any fixing points other than the enclosure around the tooth roll 103, and preferably such that each skinner 107 has a restricted free movement, but this may help reducing friction between the strippers and the tooth roll 103 and thus the power consumption. Such a friction may e.g. occur when fat and tendons are pulled between the strippers 107 and the tooth roll 103.

In this embodiment, the arc a where the support structure facing the tooth roll having an arc-shaped contour essentially following the tooth roll is in the range between 35-55°, preferably in the range between 40-50°, more preferably around 45°. This arc a range should however not be construed as being limited to these arc ranges, because arc a may just as well be less than 35°, or above 55°.

Also, the distance d 208 between adjacent teeth 104 is preferably less than the arc length $s=\alpha°/360°*2\pi r$, i.e. $d<s$, where r is the radius of the tooth roller 103. It is thus ensured that there are at least two teeth within the space 207 at all times meaning that the tension in the skin that is necessary to remove it from the carcass is present at all times.

In this embodiment, the support structure 109 comprises a shoe 201 and a clamp 202 connected to the shoe 201, where the clamp is substantially V-shaped with a smooth edge and provides a smooth separation of the fat 203 from the skin 204, whereas the shoe 201 has said arc shape. In this embodiment, at least one of the shoe or the clamp have a groove that extends transversely from a first edge to a second edge, where the elongated cutting blade 102 is positioned in the groove between the clamp 202 and the shoe 201 and extends outwardly therefrom as shown in FIGS. 1 and 2.

In this embodiment, the support structure 109 is further shaped such that behind the area 207, where the side of the support structure facing the tooth roll 103 where the arc-shaped contour essentially follows the tooth roll 103, the support structure 109 is shaped such that it deviates away 206 from the tooth roll so as to provide a guiding area for the skin 204 that has been removed from the carcass.

Figure 3:
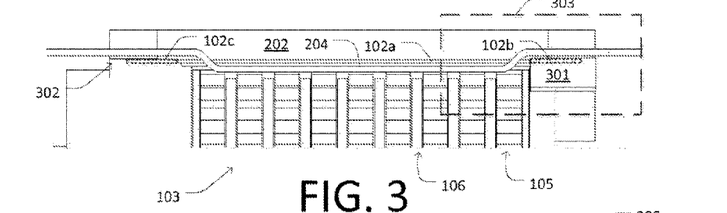
FIG. 3 shows a front view of the skinner device shown in FIG. 2.

FIG. 3 shows a front view of the skinner device shown in FIGS. 1 and 2. The length of the elongated cutting blade 102 is in this embodiment longer that the length of the tooth roll 103, where the internal arrangement between the tooth roll 103 and the elongated cutting blade 102 is such that a portion of the elongated cutting blade exceeds the opposite ends 102b,c of the tooth roll. In front of the portion 102a,b of the elongated cutting that exceeds the tooth roll 103 is an upwardly protruding portions 301, 302. The upwardly protruding structure 302 on the left may be an integral part of said housing, whereas the upwardly protruding structure on the right 301 may be a retainer, which will be discussed in more details later in relation to FIGS. 9 and 10. The role of these upwardly protruding structures is not only to shield the cutting blade exceeding at the opposite ends 102b,c, but also to force the skin at the opposite ends upwards and opposite to the moving direction of the skinning device resulting in a side cut of the skin so that skin is cut as strips. Moreover, via appropriate "turn" of the device it is easy perform a cut across the skin strip and thus release the skin from the device.

Figure 4:
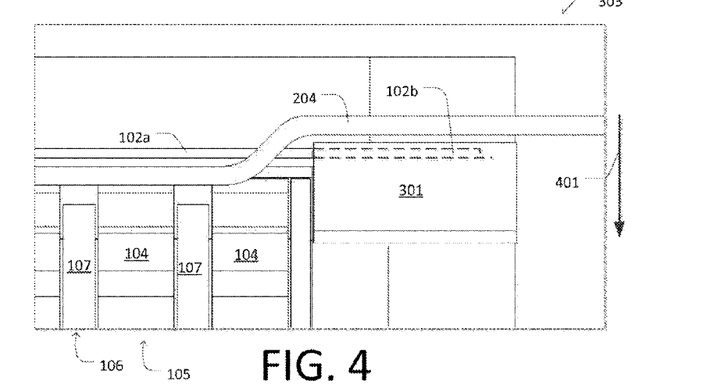
FIG. 4 shows a zoomed in view of the front view of the skinner device shown in FIG. 3.

FIG. 4 shows a zoomed in view 303 of FIG. 3, showing in more details how the retainer 301 acts as a "bump" for the skin causing the skin to lift upwards and across the elongated cutting blade 102 opposite to the moving direction of the skinning device as indicated by the arrow 401. Shown is also the strippers 107 arranged within the space 106 between adjacent tooth wheels 105 comprising said circumferentially arranged teeth 104 projecting outwardly therefrom.

Figure 5:
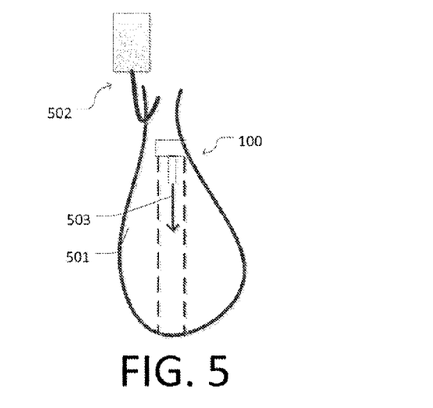
FIG. 5 depicts graphically an example of implementing the skinning device according to the present invention.

FIG. 5 depicts graphically an example of implementing the skinning device according to the present invention, where the skinning device removes skin patches or areas of skin from e.g. the fore-end 501 of a pork that may be freely hanging from a suitable hook-mechanism 502 and where the movement of the skinning device 100 is from up-to-down and indicated by the arrow 503.

In order to get a grip between the fore-end 501 of the pork and the skinning device 100 a firm surface is needed to start on that provides a sufficient repelling force, i.e. the bone part area of the fore-end as shown here, because the skinning device must hit the fore-end with some impact at the start position, where subsequently the skinning device is moved downwards as shown via arrow 503.

Figure 6:
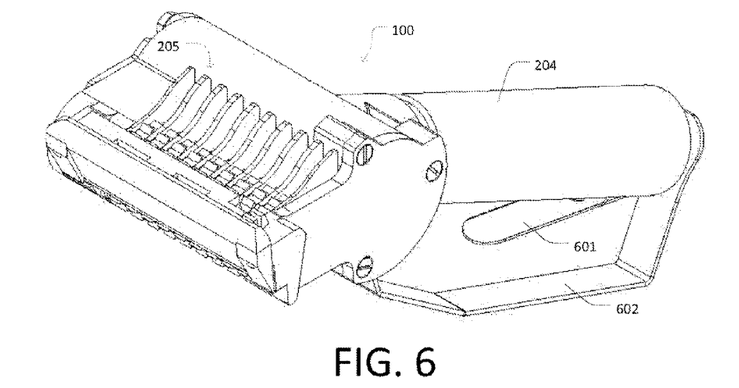
FIG. 6 shows a perspective view of one embodiment of a skinning device according to the present invention where the skinning device is implemented as a hand-held skinning device.

FIG. 6 shows a perspective view of one embodiment of a skinning device 100 according to the present invention where the skinning device is implemented as a hand-held skinning device. The manipulation arm 204 is in this embodiment a handle having associated thereto an actuating means 601 connected thereto to permit an operator of the hand-held skinning device to actuate the motor that may incorporated into the handle 204. To protect the hand-held skinning device from being activated when it is deposited, a protection bracket 602 is provided.

Said upwardly extending tail parts 205 of the skinners are also shown in this perspective view, which both facilitate the releasing of the skin from the tooth roller, and also guide the skin away from the hand-held skinning device.

Figure 7:
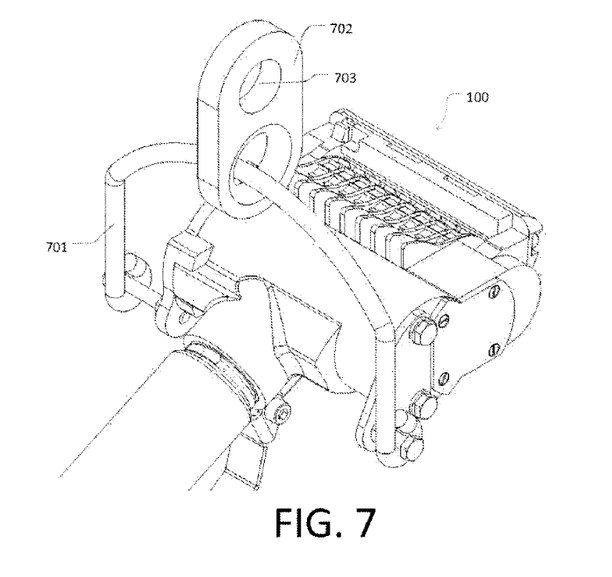
FIG. 7 shows the hand-held skinning device in FIG. 6 further comprising a hinged curved bracket mounted to the skinning device and a sliding piece that is slideable mounted to the curved bracket.

FIG. 7 shows that hand-held skinning device from FIG. 6 further comprising a hinged curved bracket 701 mounted to the skinning device 100 and a sliding piece 702 that is slideable mounted to the curved bracket 701 and that is preferably made of low-friction material so as to allow smooth sliding movement of the sliding piece along the curved bracket 702. The sliding piece has an opening 703 adapted to be attached to a suspension means (not shown) to facilitate an operator of the hand-held skinning device to move it in said up-to-down movement as depicted in FIG. 5, but such a hand-held skinning device can be heavy, depending among other things on the motor that is used. The design of the curved bracket 701 is preferably such that the center of the radius of the curve is in the center of gravity of the hand-held skinning device.

In one embodiment, the rotation axis of the motor, which may e.g. be an air motor, does not run through the center of gravity of the tool and where the axis of the air-motor may be in the center of the skinning width. The motor may in one embodiment be a lever-controlled air-motor, e.g. one of at least 400 W, where compressed air may be supplied at the back of the air-motor.

Figure 8:
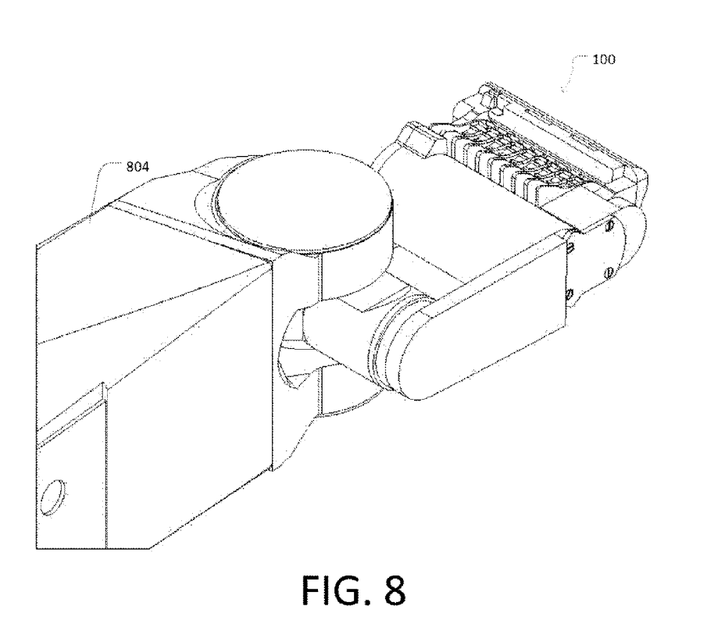
FIG. 8 shows a perspective view of another embodiment of a skinning device according to the present invention where the manipulation arm is in this embodiment a robotic arm that is an integral part of a robotic system.

FIG. 8 shows a perspective view of another embodiment of a skinning device 100 according to the present invention where the manipulation arm 804 is in this embodiment a robotic arm that is an integral part of a robotic system (not shown) that is capable of fully automatically operate the skinning device 100. The motor utilized for driving the skinning device 100 may be comprised in the robotic system, where the robotic system may further be provided with necessary sensing means to allow a fully automatic skin removal from an animal carcass, such as, but not limited to, a vision system that is capable of detecting where the initiate the skin removal process and where to end the skin removal process, e.g. such as depicted in FIG. 5.

Figure 9:
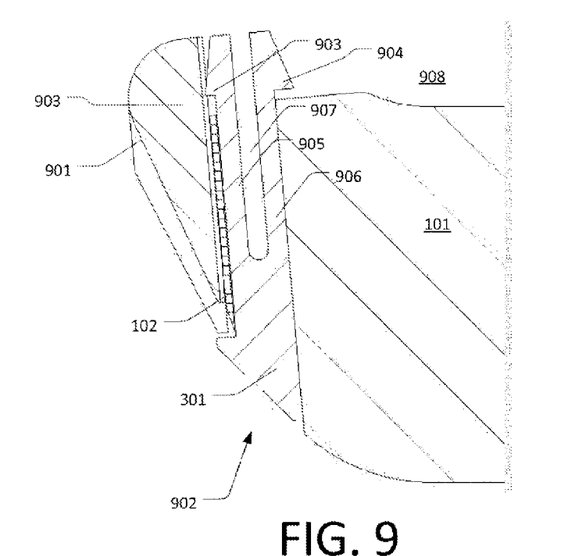
FIGS. 9 and 10 show a cross-sectional view of the retainer discussed in relation to FIGS. 3 and 4.

FIG. 9 shows a cross-sectional view of the retainer 301 discussed in relation to FIGS. 3 and 4. As depicted here, the retainer 301 engages with an opening 902 in the housing 101 of the skinning device in a clamping and non-clamping manner. One side of the retainer 301 comprises a groove 903 shaped such that the end of the elongated cutting blade 102 fits therein. It should be noted that the groove 903 is closed at the end side of the housing 101 (the right side of the housing shown in FIGS. 3 and 4) so as to maintain the elongated cutting blade in a rigid position (i.e. prevent it from sliding out of the side of the housing 101).

The retainer is preferably made of flexible material having elastic properties such as any type of plastic material. Moreover, the retainer 301 comprises elongated legs 905, 906 with an opening 907 there between, where the distal ends of the elongated legs 905, 906 have opposite protruding shoulders 903, 904.

Figure 10:
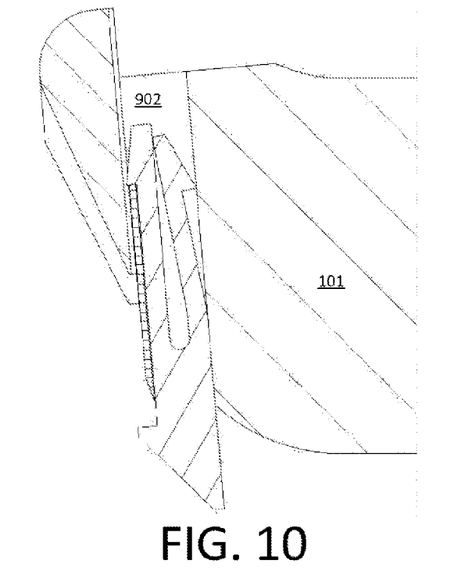

FIG. 9 depicts where the retainer is in a clamping position where the opposite protruding shoulders 903, 904 of the retainer 301 provide a "clicking effect" vie the elastic energy stored in the retainer 301 when the elongated legs 905, 906 are moved from a compressed state shown in FIG. 10 until the shoulders pass the ends of the opening 902 where the shoulder parts 903, 904 repell away from each other.

The housing 101 of the skinning device 301 has at it's end a space 908 that may be accessed via e.g. a finger of an operator so as to move the retainer 301 from the clamping state shown in FIG. 9 to an non-clamping state shown in FIG. 10. Accordingly, it is possible remove the elongated cutting blade away from the skinning device 100 very easily and in a very short time.

Figure 11:
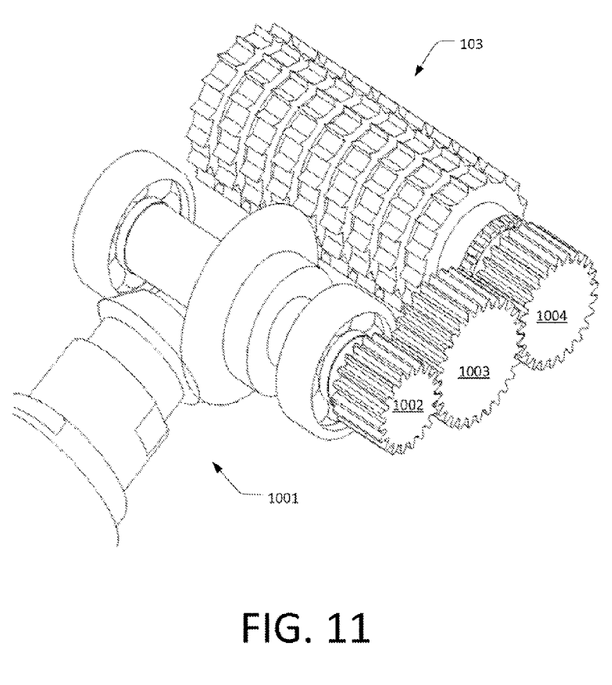
FIG. 11 shows a part of the skinning device according to the present invention in the absence of the housing so as to depict graphically one embodiment of the motor and the gearing system that is used in the skinning device.

FIG. 11 shows a part of the skinning device 100 according to the present invention in the absence of the housing 101 so as to depict graphically one embodiment of the motor and the gearing system that is used in the skinning device. The motor 1001 shown here may be, but is not limited to, an air motor with a first bevel gear 1002 attached to it. This first bevel gear 1002 drives a second bevel gear 1003 with a shaft (not shown) that may have a larger diameter than the first bevel gear 1002. Thus, the power from the motor 1001 is transmitted from the first bevel gear 1002 to the second bevel gear 1003, and from the second bevel gear 1003 to a third bevel gear 1004 that is mounted to a rotation axis of the tooth roll 103 and thus drives the tooth roll 103. Accordingly, said bevel gears act as an internal gear wheels for the tooth roll 103 which has the effect that a single tooth roll 103 can be used, instead of two (or more) tooth rollers having a space there between where fat and even skin becomes easily accumulated causing among other things blocking of the skinning device.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A skinning device for removing skin from an animal carcass, comprising:
   a housing,
   a manipulation arm extending from said housing,
   a cutting blade,
   a motor driven tooth roll mounted on said housing having plurality of tooth wheels arranged in axially spaced apart arrangement with a mutual distance between adjacent tooth wheels to define a space there between, said tooth wheels having circumferentially arranged teeth projecting outwardly therefrom adapted to grab a skin of an animal carcass and pull it towards said cutting blade,
   wherein the skinning device further comprises:
   a support structure mounted on said housing arranged in proximity to said tooth roll, said support structure being shaped such that at least a portion of a side of the support structure facing said tooth roll has an arc-shaped contour essentially following said tooth roll with a gap between the support structure and the tooth roll, said support structure being rigidly fixed in relation to said tooth roll and is adapted to engage the skin while pulling the skin along said arc between said support structure and said tooth roll while the skin is simultaneously being pulled off the carcass, and
   strippers arranged in said space between adjacent tooth wheels, where said strippers circumferentially surround at least a space portion where said arc-shaped contour essentially follows said tooth roll.

2. A skinning device according to claim 1, wherein said skinning device is a hand-held device and where said manipulation arm is a handle having a motor for driving said tooth roll incorporated therein, said handle having associated thereto an actuating means connected thereto to permit an operator of said device to actuate said motor.

3. A skinning device according to claim 1, wherein said manipulation arm comprises a robotic arm associated with a robotic system.

4. A skinning device according to claim 1, wherein support structure facing the tooth roll essentially following said tooth roll is in the range between 35-55°.

5. A skinning device according to claim 4, wherein the distance between adjacent teeth on said tooth wheels is less than the length of said arc such that at any instant of time there is a traction provided by at least two teeth while pulling the skin along said arc.

6. A skinning device according to claim 1, wherein said support structure comprises a shoe and a clamp connected to the shoe, where at least either one of said shoe or said clamp have a groove that extends transversely from a first edge to a second edge, where said cutting blade is positioned within said groove between said clamp and said shoe and extends outwardly therefrom.

7. A skinning device according to claim 1, wherein the length of said cutting blade is longer that the length of said tooth roll, the internal arrangement between the tooth roll and the cutting blade being such that a portion of the cutting blade exceeds the opposite ends of the tooth roll, and where upwardly protruding portions are provides in front of said portion of the cutting blade.

8. A skinning device according to claim 7, wherein at least one of said upwardly protruding portions is a retainer that engages with an opening in said housing in a clamping and non-clamping manner, where one side of said retainer comprises a groove shaped such that the end of said cutting blade fits therein, where said clamping of the cutting blade between said clamp and said shoe is provided via pushing the retainer into said opening with said cutting blade positioned in said groove until said clamping is achieved.

9. A skinner device according to claim 1, wherein said strippers circumferentially surround said space all around.

10. A skinner device according to claim 9, wherein said strippers are arranged such that they have a restricted free movement around said tooth roll.

11. A skinner device according to claim 9, wherein said strippers comprise upwardly extending tail parts for guiding skin removed from an animal carcass away from said skinning device and for releasing from the tooth roller.

12. A skinner device according to claim 1, wherein said support structure is further shaped such that behind said portion of the side of the support structure facing said tooth roll having the arc-shaped contour essentially following said tooth roll, the support structure is shaped such that it deviates away from said tooth roll and provides a guiding area for the skin that has been removed from said carcass.

13. A skinner device according to claim 1, where transferring the power from the motor driving said tooth wheel is based on an internal gearing system that transfers that power from a rotation axis of the motor to said tooth roller.

14. A skinner device according to claim 13, wherein said internal gearing system comprises three bevel gears arranged in a sequence and that are operable connected together, a first bevel gear that is associated to said motor and that drives a second bevel gear, and where the second bevel gear drives a third bevel gear, and where the third bevel gear is mounted to a rotation axis of the tooth roll and thus drives the tooth roll.

15. A skinner according to claim 14, wherein a diameter of said second bevel gear is larger than the diameter of said first bevel gear.

16. A method of removing skin from an animal carcass by means of using a skinner device according to claim 1, comprising:
- obtaining a grip of the skin of via said circumferentially arranged teeth of said motor driven tooth roll so as to allow the motor driven tooth roll to pull the skin towards said cutting blade, and
- providing a pulling movement of the skinner device while removing the skin while removing a skin from the animal carcass.

* * * * *